US012609338B2

(12) United States Patent
Jung et al.

(10) Patent No.: US 12,609,338 B2
(45) Date of Patent: Apr. 21, 2026

(54) APPARATUS FOR CONTROLLING OPERATION OF FUEL CELL SYSTEM AND METHOD THEREFOR

(71) Applicants: Hyundai Motor Company, Seoul (KR); Kia Corporation, Seoul (KR)

(72) Inventors: Jae Won Jung, Gyeonggi-do (KR); Jae Ho Han, Gyeonggi-do (KR); Jae Ok Ha, Gyeonggi-do (KR); Dae Jong Kim, Gyeonggi-do (KR); Sang Wook Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 951 days.

(21) Appl. No.: 17/864,877

(22) Filed: Jul. 14, 2022

(65) Prior Publication Data

US 2023/0170505 A1 Jun. 1, 2023

(30) Foreign Application Priority Data

Nov. 26, 2021 (KR) ........................ 10-2021-0165169

(51) Int. Cl.
| | |
|---|---|
| *H01M 8/04858* | (2016.01) |
| *H01M 8/04082* | (2016.01) |
| *H01M 8/0438* | (2016.01) |
| *H01M 8/04537* | (2016.01) |
| *H01M 8/04791* | (2016.01) |

(52) U.S. Cl.
CPC ..... *H01M 8/0488* (2013.01); *H01M 8/04201* (2013.01); *H01M 8/04388* (2013.01); *H01M 8/04559* (2013.01); *H01M 8/04798* (2013.01)

(58) Field of Classification Search
None
See application file for complete search history.

(56) References Cited

U.S. PATENT DOCUMENTS

| | | | | |
|---|---|---|---|---|
| 8,119,297 B2 * | 2/2012 | Kwon | ................. | H01M 16/006 |
| | | | | 429/429 |
| 11,223,055 B2 * | 1/2022 | Park | .................. | H01M 8/04992 |
| 2010/0009219 A1 * | 1/2010 | Kwon | ............... | H01M 8/04567 |
| | | | | 429/432 |
| 2012/0301803 A1 * | 11/2012 | Wake | ...................... | B60L 50/51 |
| | | | | 429/429 |
| 2013/0209906 A1 * | 8/2013 | Harris | ............... | H01M 8/04559 |
| | | | | 429/429 |
| 2013/0244125 A1 * | 9/2013 | Wake | ................ | H01M 8/04761 |
| | | | | 429/415 |

(Continued)

FOREIGN PATENT DOCUMENTS

JP 2008251315 A 10/2008

*Primary Examiner* — Haroon S. Sheikh
(74) *Attorney, Agent, or Firm* — Fox Rothschild LLP

(57) ABSTRACT

The present disclosure relates to an apparatus for controlling an operation of a fuel cell system and a method therefor. The present disclosure may include a voltage sensor that measures an output voltage of a fuel cell stack, an air compressor that supplies air to a cathode of the fuel cell stack, a valve driver that adjusts an opening degree of an Airflow Control Valve (ACV), and a controller that, in an idle stop state, drives the air compressor at a lowest level and controls the opening degree of the ACV such that the output voltage of the fuel cell stack maintains a reference range.

9 Claims, 8 Drawing Sheets

(56)          References Cited

U.S. PATENT DOCUMENTS

2014/0272657  A1*  9/2014  Milacic ............ H01M 8/04753
                                                        429/444
2017/0047602  A1*  2/2017  Sato .................. H01M 8/04798
2020/0251761  A1*  8/2020  Kaneko .............. H01M 8/0494

* cited by examiner

APPARATUS FOR CONTROLLING OPERATION OF FUEL CELL SYSTEM AND METHOD THEREFOR

CROSS-REFERENCE TO RELATED APPLICATION

This application claims, under 35 U.S.C. § 119(a), the benefit of Korean Patent Application No. 10-2021-0165169, filed in the Korean Intellectual Property Office on Nov. 26, 2021, the entire contents of which are incorporated herein by reference.

BACKGROUND

Technical Field

Embodiments of the present disclosure relate to technologies for controlling operation of a fuel cell system in an idle stop state in which power generation of a fuel cell is temporarily stopped.

Description of the Related Art

In general, a fuel cell vehicle includes a fuel cell stack in which a plurality of fuel cells, used as power sources, are stacked, a fuel supply system that supplies hydrogen or the like, which is a fuel, to the fuel cell stack, an air supply system that supplies oxygen, that is an oxidizing agent required for electrochemical reactions, a water and heat management system that controls the temperature of the fuel cell stack, and the like.

The fuel supply system depressurizes compressed hydrogen inside a hydrogen tank to supply the hydrogen to a fuel electrode (anode) of the fuel cell stack, and the air supply system supplies external air suctioned by operating an air blower to an air electrode (cathode) of the fuel cell stack.

When hydrogen is supplied to the fuel electrode of the fuel cell stack, and the oxygen is supplied to the air electrode of the fuel cell stack, hydrogen ions are separated from the fuel electrode through a catalytic reaction. The separated hydrogen ions are transferred to an oxidation electrode that is the air electrode through an electrolyte membrane, and in the oxidation electrode, the hydrogen ions separated from the fuel electrode, electrons, and the oxygen generate an electrochemical reaction together, thereby obtaining electrical energy. In detail, electrochemical oxidation of the hydrogen occurs in the fuel electrode, and electrochemical reduction of the oxygen occurs in the air electrode. In this case, electricity and heat are generated due to movement of the generated electrons, and water vapor or water is generated due to a chemical reaction in which the hydrogen and the oxygen are combined.

To discharge by-products such as the water vapor, the water, and the heat generated while the fuel cell stack generates electric energy and the hydrogen, the oxygen, and the like that do not react, an exhaust device is provided, and gases such as the water vapor, the hydrogen, and the oxygen are discharged to the atmosphere through an exhaust passage.

Components such as an air blower, a hydrogen recirculation blower, and a water pump for driving the fuel cell stack may be connected to a main bus terminal to facilitate starting of the fuel cell stack, and various relays for facilitating power blocking and power connection and diodes for preventing reverse current from flowing to the fuel cell stack may be connected to the main bus terminal.

Dry air supplied through the air blower is humidified through a humidifier and is then supplied to the cathode (air electrode) of the fuel cell stack, and exhaust gas of the cathode is transferred to the humidifier in a state of being humidified due to a water component generated therein and may be used to humidify the dry air to be supplied to the cathode by the air blower.

Meanwhile, to improve fuel efficiency, a process of stopping or restarting power generation of the fuel cell as needed while a vehicle is driven (Fuel Cell Stop and Fuel Cell Restart), that is, an idle stop process of temporarily stopping the power generation of the fuel cell in a fuel cell vehicle and an ON/OFF control process of the fuel cell should be considered as being important.

In the related art for controlling operation of the fuel cell system, when an idle stop state is started, an air compressor is stopped in a state in which the supply pressure of the hydrogen is reduced to the minimum pressure and an Airflow Control Valve (ACV) is fully opened in a stack direction, and when the idle stop state is released, the air compressor is driven while maintaining a state in which the supply pressure of the hydrogen is increased to an operating pressure, and the ACV is fully opened in the stack direction.

In the existing technologies, when the idle stop state is maintained for a long time, a voltage of the fuel cell stack is decreased to 0 V, and thus durability of the fuel cell stack is weakened.

Further, in the existing technologies, in the idle stop state, a concentration of the hydrogen continuously decreases, that is, the air compressor is stopped, and thus the hydrogen on the anode side crosses over to the cathode side. Thereafter, when the idle stop state is released, the fuel cell stack is operated at a low concentration of the hydrogen, and thus the durability of the fuel cell stack is weakened.

Contents described in the existing technologies are made to promote understanding of the background of the disclosure and may include contents that are not the related art already known to those skilled in the art to which this technology belongs.

SUMMARY

Embodiments of the present disclosure have been made to solve the above-mentioned problems occurring in the existing technologies while advantages achieved by the existing technologies are maintained intact.

An exemplary embodiment of the present disclosure provides an apparatus for controlling an operation of a fuel cell system and a method therefor, in which, in an idle stop state in which power generation of a fuel cell is temporarily stopped, an air compressor that supplies air to a cathode of a fuel cell stack is driven at a lowest level, an opening degree of an Airflow Control Valve (ACV) is controlled so that an output voltage of the fuel cell stack maintains a reference range, and thus durability of the fuel cell stack may be prevented from being degraded.

The purposes of the present disclosure may be not limited to the purposes described above, and other purposes and advantages of the present disclosure that are not described may be understood by the following description and may be more clearly understood by embodiments of the present disclosure. Further, it may be easily identified that the purposes and advantages of the present disclosure may be implemented by units and combinations thereof described in the appended claims.

According to an exemplary embodiment of the present disclosure, there is provided an apparatus for controlling an operation of a fuel cell system, the apparatus including a voltage sensor configured to measure an output voltage of a fuel cell stack, an air compressor configured to supply air to a cathode of the fuel cell stack, a valve driver configured to adjust an opening degree of an ACV, and a controller that, in an idle stop state, is configured to drive the air compressor at a lowest level and is configured to control the opening degree of the ACV so that the output voltage of the fuel cell stack maintains a reference range.

In an exemplary embodiment of the present disclosure, the controller may be configured to control the valve driver so that, when the idle stop state is started, the ACV is configured to discharge all the air supplied from the air compressor through an air discharge line without supplying the air to the cathode of the fuel cell stack.

In an exemplary embodiment of the present disclosure, the controller may be configured to control the valve driver so that, in the idle stop state, the ACV is configured to supply, to the cathode of the fuel cell stack, an amount of air required for maintaining the output voltage of the fuel cell stack in the reference range and discharge, through an air discharge line, the air passing through the cathode of the fuel cell stack.

In an exemplary embodiment of the present disclosure, the valve driver may further be configured to adjust opening or closing of a Fuel Discharge Valve (FDV).

In an exemplary embodiment of the present disclosure, the controller may be configured to control the valve driver to open the FDV when a concentration of hydrogen on an anode side of the fuel cell stack is less than or equal to a reference value.

In an exemplary embodiment of the present disclosure, the controller may be configured to control the valve driver to open the FDV during a reference time.

In an exemplary embodiment of the present disclosure, the controller may be configured to control the air compressor such that a pressure of the air supplied to the cathode of the fuel cell stack is increased.

According to another exemplary embodiment of the present disclosure, there is provided a method of controlling an operation of a fuel cell system, the method including driving, by a controller, an air compressor that supplies air to a cathode of a fuel cell stack at a lowest level in an idle stop state, and controlling, by the controller, an opening degree of an ACV so that an output voltage of the fuel cell stack maintains a reference range.

In an exemplary embodiment of the present disclosure, the controlling of the opening degree of the ACV may include discharging all the air supplied from the air compressor through an air discharge line without supplying the air to the cathode of the fuel cell stack when the idle stop state is started.

In an exemplary embodiment of the present disclosure, the controlling of the opening degree of the ACV may include supplying, to the cathode of the fuel cell stack, an amount of air required for maintaining the output voltage of the fuel cell stack in the reference range and discharging, through an air discharge line, the air passing through the cathode of the fuel cell stack in the idle stop state.

In an exemplary embodiment of the present disclosure, the method may further include opening, by the controller, an FDV when a concentration of hydrogen on an anode side of the fuel cell stack is less than or equal to a reference value.

In an exemplary embodiment of the present disclosure, the opening of the FDV may include opening the FDV during a reference time, and controlling the air compressor such that a pressure of the air supplied to the cathode of the fuel cell stack is increased.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
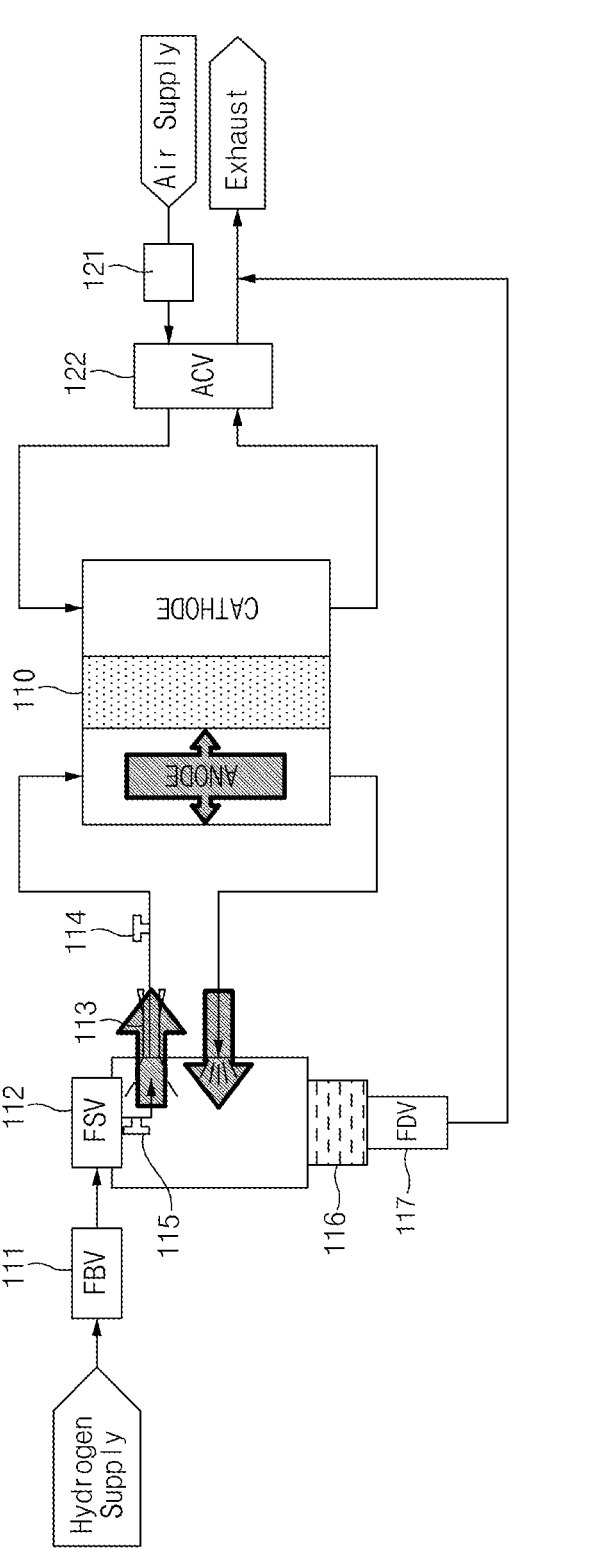
FIG. 1 is an exemplary view of a fuel cell system to which an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In the description of components of the embodiments of the present disclosure, the terms such as first, second, A, B, (a) and (b) may be used. These terms are not used to delimit an essence, an order or sequence, and the like of a corresponding component but used merely to distinguish the corresponding component from other component(s). Further, unless otherwise defined, all terms used herein including technical or scientific terms have the same meanings as those commonly understood by those skilled in the art to which the present disclosure belongs. The terms defined in the generally used dictionaries should be construed as having the meanings that coincide with the meanings of the contexts of the related technologies and should not be construed as ideal or excessively formal meanings unless clearly defined in the present application.

FIG. 1 is an exemplary view of a fuel cell system to which an exemplary embodiment of the present disclosure is applied.

As illustrated in FIG. 1, the fuel cell system to which the embodiment of the present disclosure is applied may include a fuel cell stack 110, a Fuel Block Valve (FBV) 111, a Fuel Supply Valve (FSV) 112, a Fuel EJector (FEJ) 113, a Fuel Pressure Sensor (FPS) 114, a Fuel Supply Pressure Sensor (FSPS) 115, a Fuel-line Water Trap (FWT) 116, a Fuel Discharge Valve (FDV) 117, an air compressor 121, an Airflow Control Valve (ACV) 122, and the like.

In the description of the respective components, first, the FBV 111 may be configured to serve to block hydrogen supplied to the fuel cell stack 110. The FSV 112 may be configured to serve to adjust a pressure of the hydrogen supplied to the fuel cell stack 110. The FEJ 113 may be configured to serve to supply the hydrogen to the fuel cell stack 110 by applying the pressure to the hydrogen. The FPS 114 may be configured to serve to measure the pressure of the hydrogen supplied to the fuel cell stack 110. The FSPS 115 may be configured to serve to measure an initial pressure of the hydrogen supplied to the fuel cell stack 110. The FWT 116 may be configured to serve to store water. The FDV 117 may be configured to serve to discharge a condensate and an impurity on an anode side in the fuel cell stack 110.

The air compressor 121 may be configured to supply air to a cathode of the fuel cell stack 110. In this case, a driving level (a lowest level, a middle level, a highest level, or the like) of the air compressor 121 may be determined by a controller 40.

The ACV 122 may be configured to connect an air supply line and an air discharge line to each other or block the air supply line and the air discharge line from each other.

The ACV 122 may be configured to discharge all the air supplied from the air compressor 121 through the air discharge line without supplying the air to the cathode of the fuel cell stack 110.

Further, the ACV 122 may be configured to supply a portion of the air supplied from the air compressor 121 to the cathode of the fuel cell stack 110 and discharge the remaining air through the air discharge line. At the same time, the ACV 122 may be configured to discharge, through the air discharge line, the air passing through the cathode of the fuel cell stack 110. That is, the ACV 122 may be configured to simultaneously discharge, through the air discharge line, the remaining air and the air passing through the cathode of the fuel cell stack 110.

Further, the ACV 122 may be configured to supply the air supplied from the air compressor 121 to the cathode of the fuel cell stack 110 and discharge, through the air discharge line, the air passing through the cathode of the fuel cell stack 110.

Figure 2:
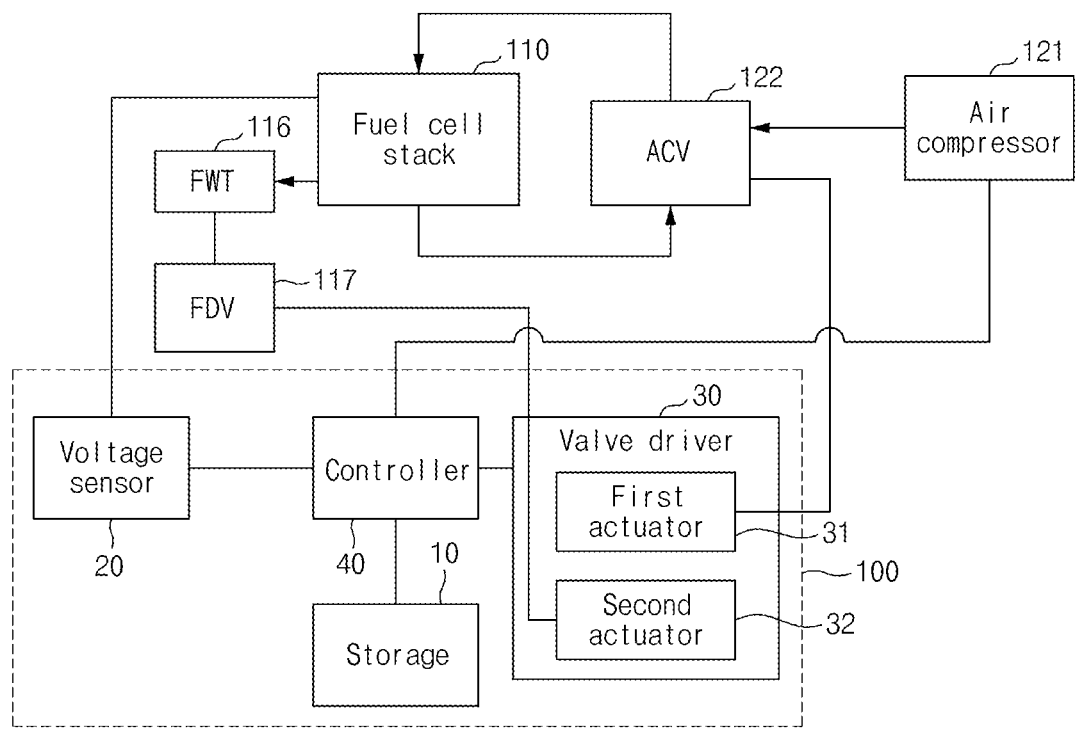
FIG. 2 is a block diagram of an apparatus for controlling an operation of a fuel cell system according to an exemplary embodiment of the present disclosure.

FIG. 2 is a block diagram of an apparatus configured for controlling an operation of a fuel cell system according to an exemplary embodiment of the present disclosure.

As illustrated in FIG. 2, an apparatus 100 configured for controlling an operation of a fuel cell system according to an exemplary embodiment of the present disclosure may include storage 10, a voltage sensor 20, a valve driver 30, and the controller 40. In this case, according to a method of implementing the apparatus 100 for controlling an operation of a fuel cell system according to the embodiment of the present disclosure, respective components may be combined with each other to be implemented as one component or some components may be omitted.

In description of the respective components, first, the storage 10 may be configured to store various logics, algorithms, and programs required for, in an idle stop state in which power generation of the fuel cell is temporarily stopped, driving the air compressor 121 for supplying the air to the cathode of the fuel cell stack 110 at the lowest level (for example, a base Revolution Per Minute (RPM)) and required in a process of controlling an opening degree of the ACV 122 so that an output voltage of the fuel cell stack 110 maintains a reference range.

The storage 10 may be configured to store a reference range V_Low to V_Up of the output voltage of the fuel cell stack 110. In this case, the reference range may be varied according to an intention of a designer.

The storage 10 may include at least one of storage medium among a flash memory, a hard disk type memory, a micro type memory, a card type memory (for example, a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The voltage sensor 20 may be configured to measure the output voltage of the fuel cell stack 110.

The valve driver 30, which is a kind of actuator for adjusting the opening degree of the ACV 122 and opening/closing of the FDV 117, may include a first actuator 31 configured for adjusting the opening degree of the ACV 122 and a second actuator 32 configured for adjusting the opening/closing of the FDV 117.

The controller 40 may be configured to perform overall control so that the respective components may normally perform functions thereof. The controller 40 may be implemented in the form of hardware, may be implemented in the form of software, or may be implemented in the form in which the hardware and the software are combined. It is preferable that the controller 40 may be implemented as a microprocessor, but the present disclosure is not limited thereto.

In particular, in the idle stop state in which the power generation of the fuel cell is temporarily stopped, the controller 40 may be configured to drive the air compressor 121 for supplying the air to the cathode of the fuel cell stack 110 at the lowest level (for example, the base RPM) and control the opening degree of the ACV 122 so that the output voltage of the fuel cell stack 110 maintains the reference range.

Hereinafter, a detailed operation of the controller 40 will be described with reference to FIGS. 3 to 6.

Figure 3:
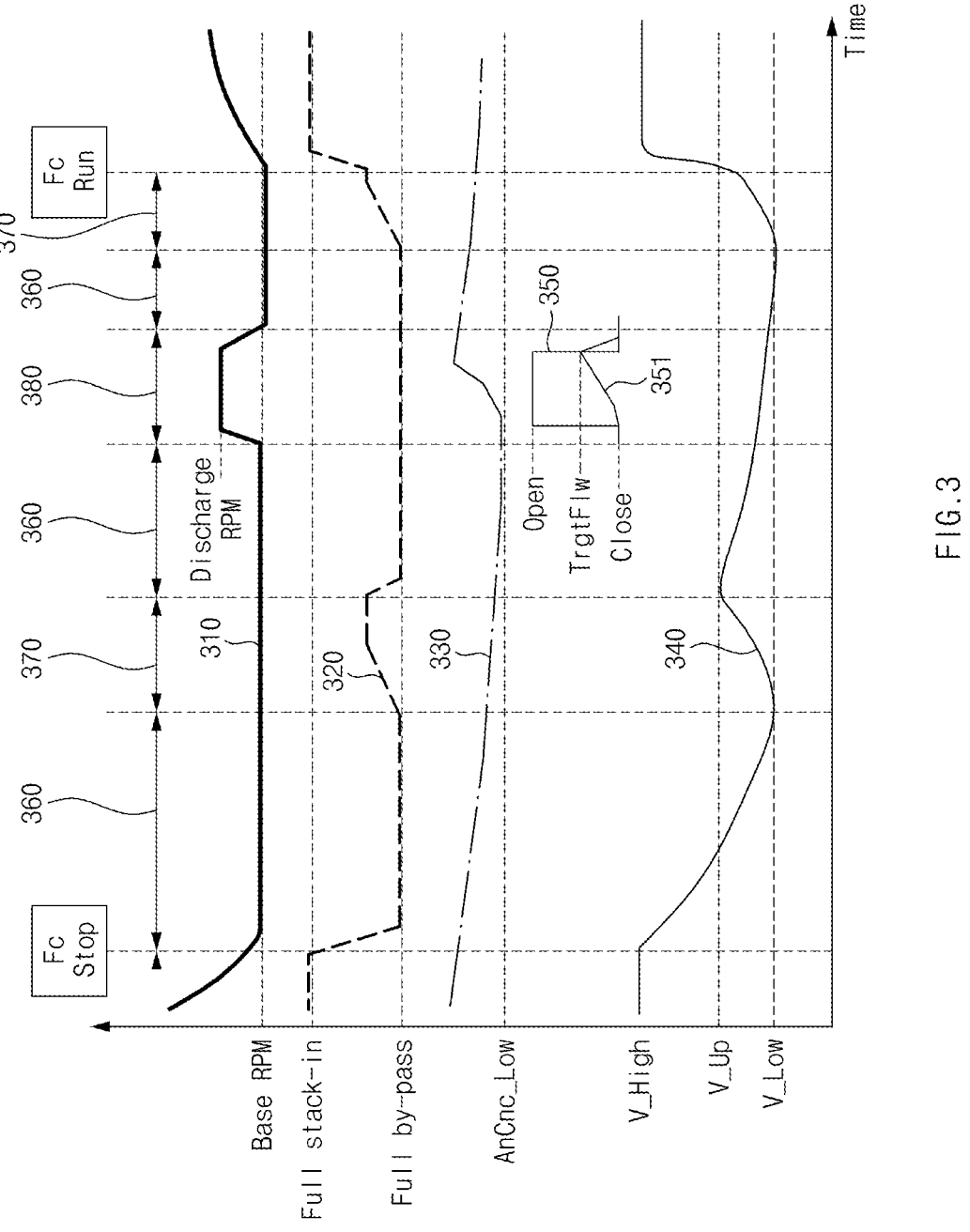
FIG. 3 is an exemplary view for describing an operation of a controller provided in the apparatus for controlling an operation of a fuel cell system according to an exemplary embodiment of the present disclosure.

FIG. 3 is an exemplary view for describing an operation of a controller provided in the apparatus configured for controlling an operation of a fuel cell system according to an exemplary embodiment of the present disclosure.

In FIG. 3, a graph "310" denotes an RPM of the air compressor 121 at which the air compressor 121 supplies the air to the cathode of the fuel cell stack 110, a graph "320" denotes the opening degree of the ACV 122 (or the amount of the air supplied to the cathode of the fuel cell stack 110), a graph "330" denotes a concentration of the hydrogen in the anode of the fuel cell stack 110, a graph "340" denotes the output voltage of the fuel cell stack 110, a section "350" denotes whether the FDV 117 is opened, and a section "351" denotes a purge discharge amount according to the opening of the FDV 117.

Further, a section "360" denotes a section in which the output voltage of the fuel cell stack 110 is decreased by operating the controller 40 in the idle stop state, a section "370" denotes a section in which the output voltage of the fuel cell stack 110 is increased by operating the controller 40 in the idle stop state, and a section "380" denotes a section in which the concentration of the hydrogen in the anode of the fuel cell stack 110 is maintained at a constant level by operating the controller 40 in the idle stop state.

Figure 4:
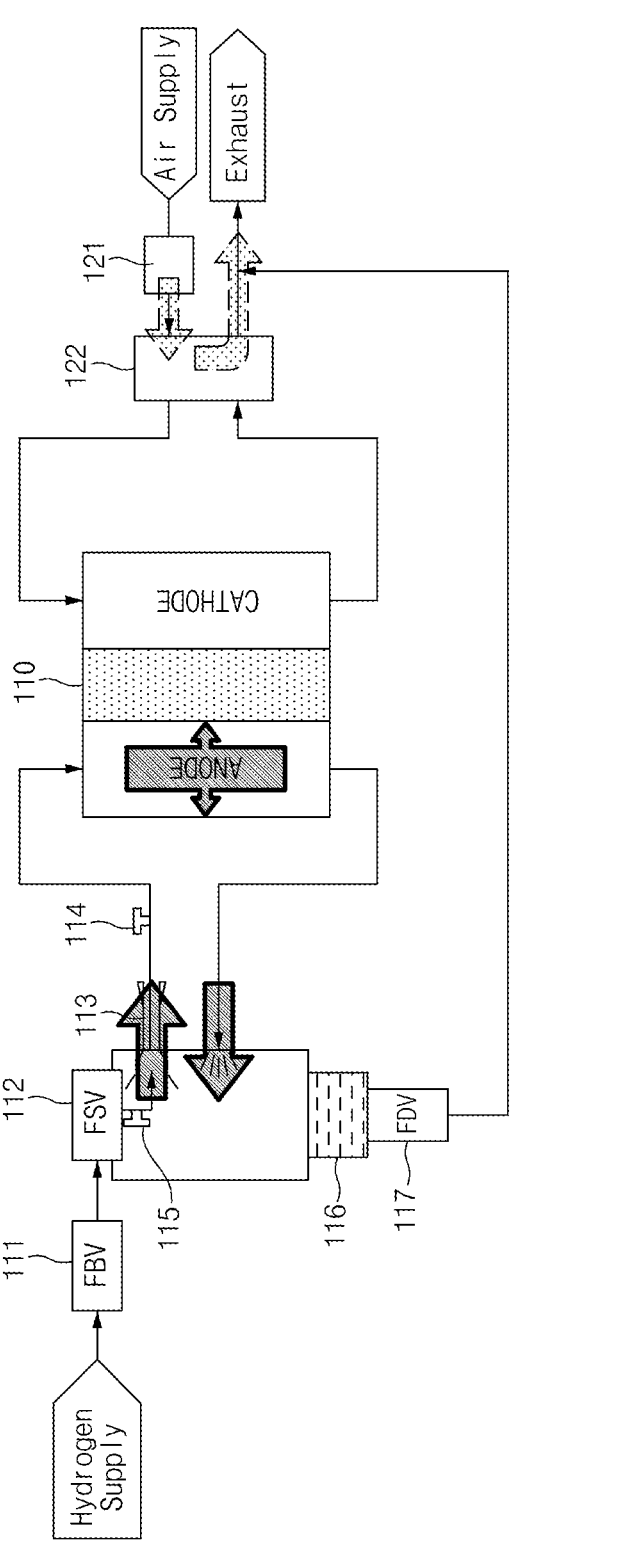
FIG. 4 is an exemplary view illustrating a first operation of the controller provided in the apparatus for controlling an operation of a fuel cell system according to an exemplary embodiment of the present disclosure.

The section 360 is a section in which the output voltage of the fuel cell stack 110 is decreased, and the controller 40 may be configured to perform a first operation as illustrated in FIG. 4 when the idle stop state is started.

FIG. 4 is an exemplary view illustrating a first operation of the controller provided in the apparatus configured for controlling an operation of a fuel cell system according to the embodiment of the present disclosure.

As illustrated in FIG. 4, the controller 40 may be configured to drive the air compressor 121 for supplying the air to the cathode of the fuel cell stack 110 at the lowest level and control the ACV 122 to discharge all the air supplied from the air compressor 121 through the air discharge line without supplying the air to the cathode of the fuel cell stack 110. In this case, the controller 40 may be configured to control the first actuator 31 so that the ACV 122 discharges all the air supplied from the air compressor 121 through the air discharge line without supplying the air to the cathode of the fuel cell stack 110.

Figure 5:
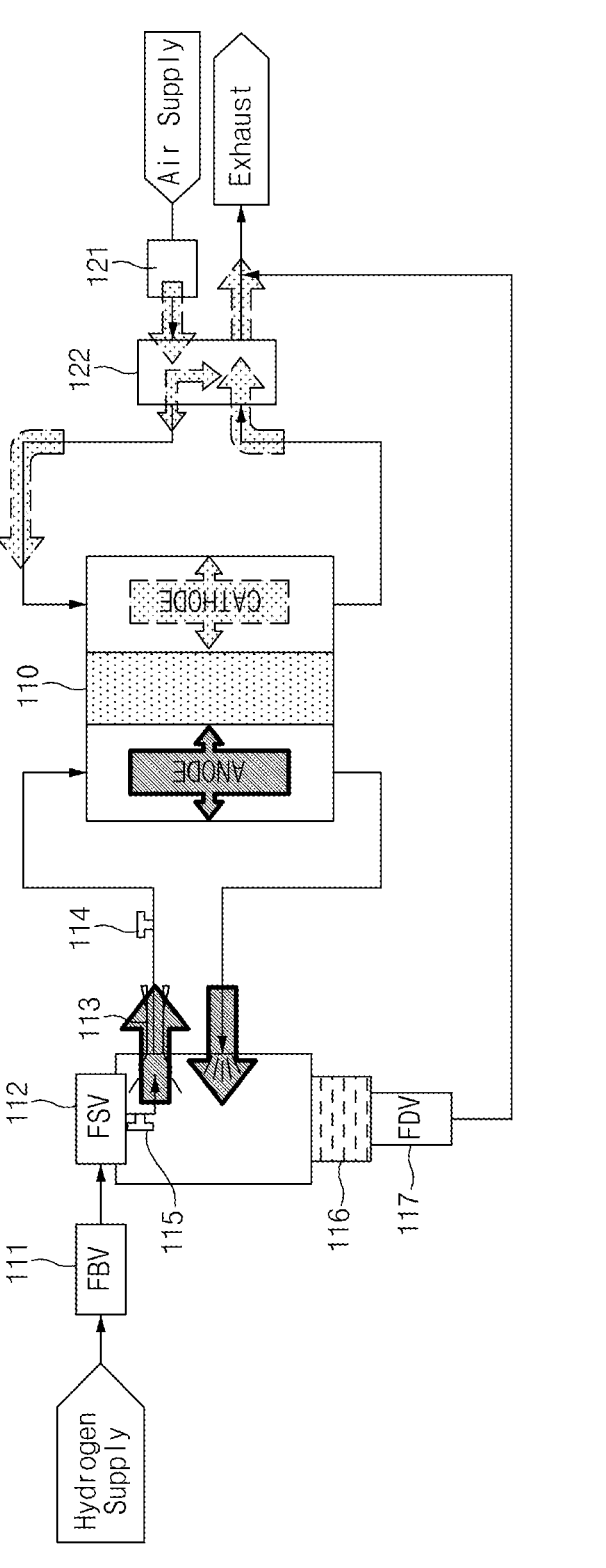
FIG. 5 is an exemplary view illustrating a second operation of the controller provided in the apparatus for controlling an operation of a fuel cell system according to an exemplary embodiment of the present disclosure.

The section "370" is a section in which the output voltage of the fuel cell stack 110 is increased, and the controller 40 may be configured to perform a second operation as illustrated in FIG. 5 in the idle stop state.

FIG. 5 is an exemplary view illustrating a second operation of the controller provided in the apparatus for controlling an operation of a fuel cell system according to the embodiment of the present disclosure.

As illustrated in FIG. 5, the controller 40 may be configured to control the ACV 122 to supply a portion of the air supplied from the air compressor 121 to the cathode of the fuel cell stack 110, to discharge the remaining air through the air discharge line, and to also discharge the air passing through the cathode of the fuel cell stack 110 through the air discharge line. In this case, the controller 40 may be configured to supply, to the cathode of the fuel cell stack 110, the amount of the air required for maintaining the output voltage of the fuel cell stack 110 in the reference range. Further, the controller 40 may be configured to control the first actuator 31 so that the ACV 122 discharges the air passing through the cathode of the fuel cell stack 110 through the air discharge line.

Figure 6:
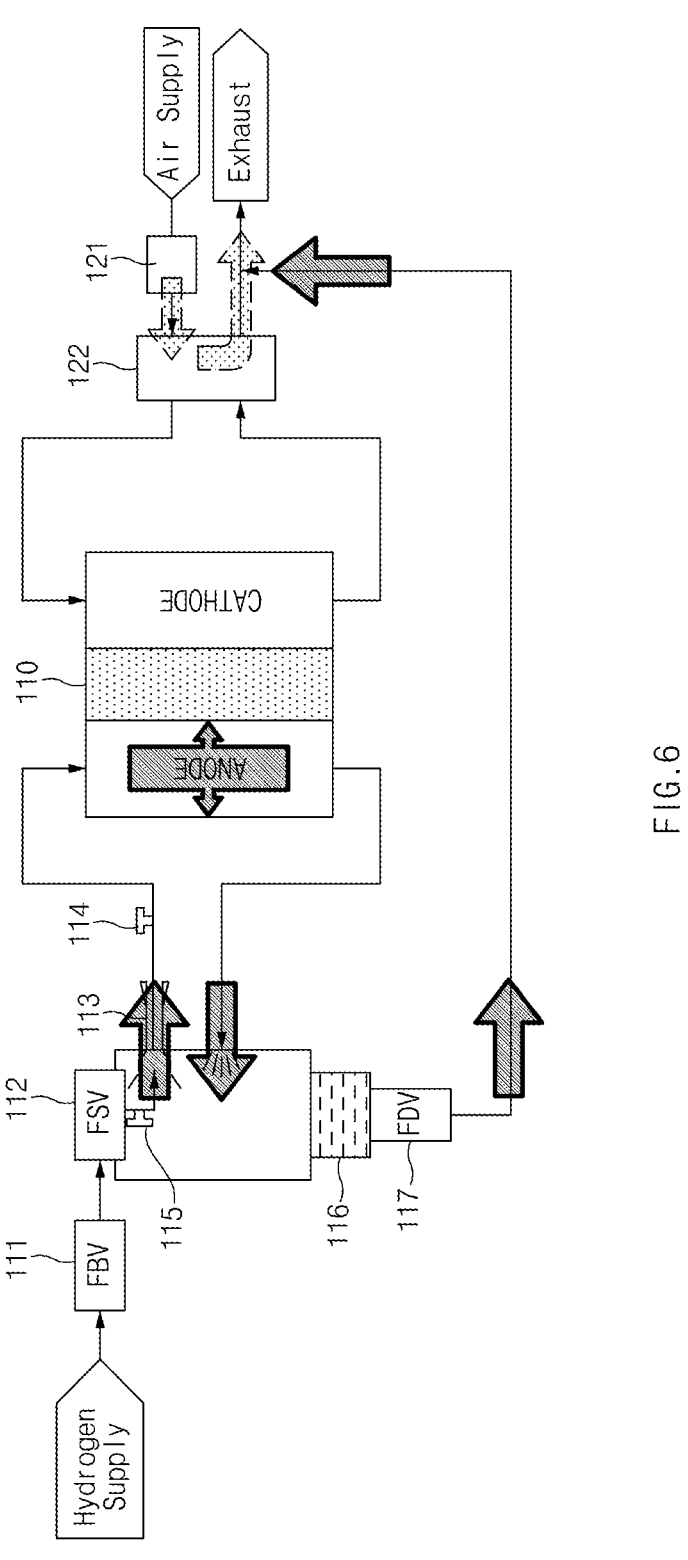
FIG. 6 is an exemplary view illustrating a third operation of the controller provided in the apparatus for controlling an operation of a fuel cell system according to an exemplary embodiment of the present disclosure.

The section "380" is a section in which the concentration of the hydrogen on the anode side of the fuel cell stack 110 is adjusted, and the controller 40 may be configured to perform a third operation as illustrated in FIG. 6 in the idle stop state.

FIG. 6 is an exemplary view illustrating a third operation of the controller provided in the apparatus for controlling an operation of a fuel cell system according to the embodiment of the present disclosure.

As illustrated in FIG. 6, the controller 40 may be configured to drive the air compressor 121 for supplying the air to the cathode of the fuel cell stack 110 at the lowest level and control the ACV 122 to discharge all the air supplied from the air compressor 121 through the air discharge line instead of supplying the air to the cathode of the fuel cell stack 110, and may also be configured to open the FDV 117 to perform a hydrogen purge on the anode side of the fuel cell stack 110.

That is, when the concentration of the hydrogen on the anode side of the fuel cell stack 110 is equal to or smaller than a reference value, AnCnc_Low, the controller 40 may be configured to control the second actuator 32 to open the FDV 117 until a purge discharge amount reaches a reference value, TrgtFlw, in addition to performing the first operation as illustrated in FIG. 4. In this case, the controller 40 may be configured to estimate the concentration of the hydrogen on the anode side of the fuel cell stack 110, which may be generally implemented in various widely known manners. Further, the controller 40 may be configured to include a table in which the purge discharge amount according to an opening time of the FDV 117 is recorded.

Figure 7:
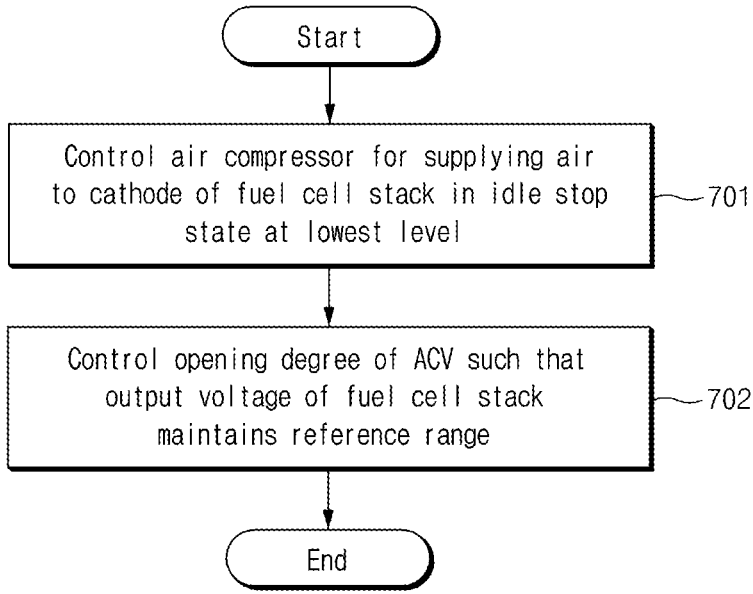
FIG. 7 is a flowchart of a method of controlling an operation of a fuel cell system according to an exemplary embodiment of the present disclosure.

FIG. 7 is a flowchart of a method of controlling an operation of a fuel cell system according to an exemplary embodiment of the present disclosure.

First, the controller 40 controls the air compressor 121 for supplying the air to the cathode of the fuel cell stack 110 at the lowest level in the idle stop state (701). That is, the controller 40 drives the air compressor 121 at the lowest level.

Thereafter, the controller 40 controls the opening amount of the ACV 122 so that the output voltage of the fuel cell stack 110 is maintained in the reference range (702).

Figure 8:
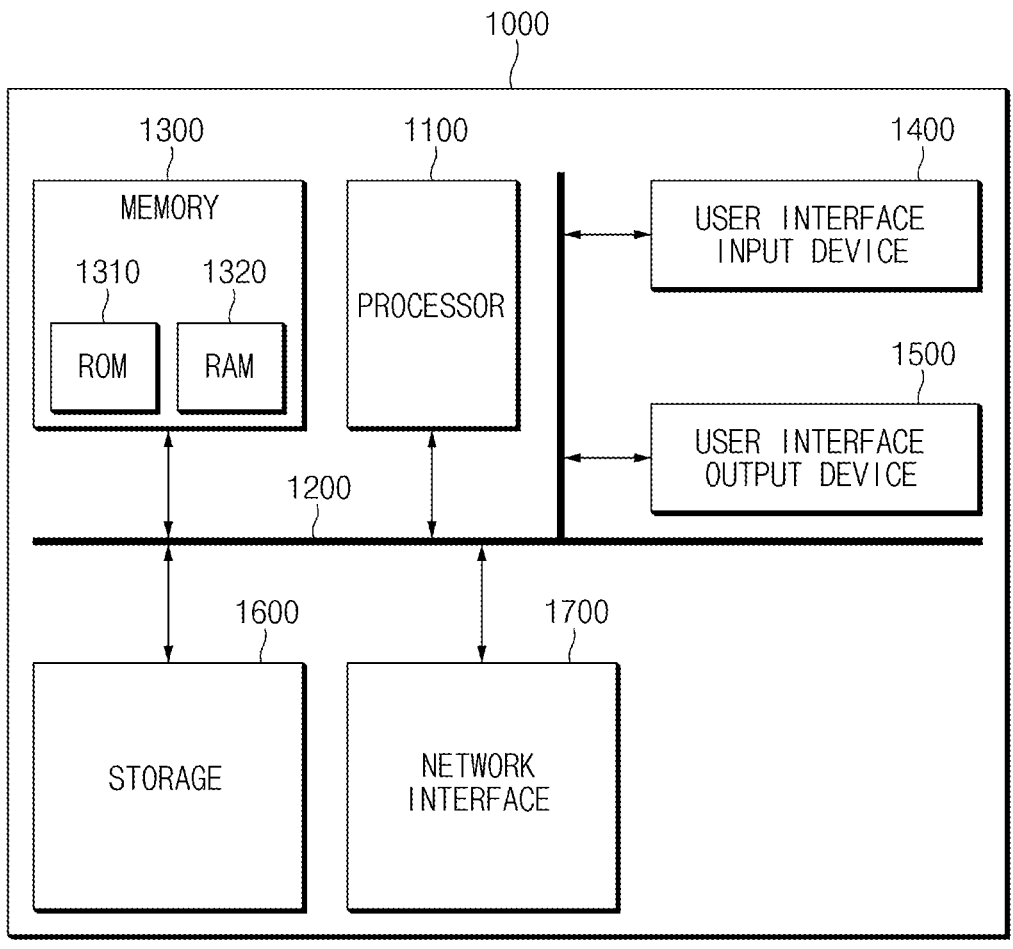
FIG. 8 is a block diagram illustrating a computing system for executing the method of controlling an operation of a fuel cell system according to an exemplary embodiment of the present disclosure.

FIG. 8 is a block diagram illustrating a computing system for executing the method of controlling an operation of a fuel cell system according to an exemplary embodiment of the present disclosure.

Referring to FIG. 8, the method of controlling an operation of a fuel cell system according to an exemplary embodiment of the present disclosure may be implemented even through the computing system. A computing system 1000 may include at least one processor 1100, a memory 1300, a user interface input device 1400, a user interface output device 1500, storage 1600, and a network interface 1700, which are connected through a system bus 1200.

The processor 1100 may be a central processing unit (CPU) or a semiconductor device that processes commands stored in the memory 1300 and/or storage 1600. The memory 1300 and the storage 1600 may be configured to include various types of volatile or nonvolatile storage media. For example, the memory 1300 may include a ROM 1310 and a RAM 1320.

Thus, operations of a method or algorithm described in connection with the embodiments disclosed herein may be directly implemented in hardware, a software module, or a combination of the two components, which are executed by the processor 1100. The software module may reside in a storage medium (that is, the memory 1300 and/or the storage 1600) such as a RAM, a flash memory, a ROM, an EPROM, an EEPROM, a register, a hard disk, a solid state drive (SSD), a removable disk, and a compact disk (CD)-ROM. An exemplary storage medium may be coupled to the processor 1100, and the processor 1100 may read information from the storage medium and write information in the storage medium. In another manner, the storage medium may be integrated with the processor 1100. The processor and the storage medium may reside inside an application-specific integrated circuit (ASIC). The ASIC may reside inside a user terminal. In still another manner, the processor and the storage medium may reside as an individual component inside the user terminal.

In an apparatus for controlling an operation of a fuel cell system and a method therefor according to an embodiment of the present disclosure, in an idle stop state in which power generation of a fuel cell is temporarily stopped, an air compressor that supplies air to a cathode of a fuel cell stack is driven at a lowest level, an opening degree of an ACV is controlled so that an output voltage of the fuel cell stack maintains a reference range, and thus durability of the fuel cell stack may be prevented from being degraded.

The above description is merely illustrative of the technical spirit of the present disclosure, and those skilled in the art to which the present disclosure belongs may make various modifications and changes without departing from the essential features of the present disclosure.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. An apparatus for controlling an operation of a fuel cell system, the apparatus comprising:
   a voltage sensor configured to measure an output voltage of a fuel cell stack;
   an air compressor configured to supply air to a cathode of the fuel cell stack;
   a valve driver configured to adjust an opening degree of an Airflow Control Valve (ACV); and
   a controller configured, in an idle stop state, to:
      drive the air compressor at a lowest level; and
      control the opening degree of the ACV so that the output voltage of the fuel cell stack maintains a reference range;
   wherein the valve driver is further configured to adjust opening or closing of a Fuel Discharge Valve (FDV); and
   wherein the controller is further configured, in the idle stop state, to control the valve driver to open the FDV when a concentration of hydrogen on an anode side of the fuel cell stack is less than or equal to a reference value.

2. The apparatus of claim 1, wherein the controller is configured to control the valve driver such that, when the idle stop state is started, the ACV discharges all the air supplied from the air compressor through an air discharge line without supplying the air to the cathode of the fuel cell stack.

3. The apparatus of claim 1, wherein the controller is configured to control the valve driver such that, in the idle stop state, the ACV:
   supplies, to the cathode of the fuel cell stack, an amount of air required for maintaining the output voltage of the fuel cell stack in the reference range; and
   discharges, through an air discharge line, the air passing through the cathode of the fuel cell stack.

4. The apparatus of claim 1, wherein the controller is further configured to control the valve driver to open the FDV during a reference time.

5. The apparatus of claim 1, wherein the controller is further configured, during the idle stop state and while the FDV is open, to control the air compressor such that a pressure of the air supplied to the cathode of the fuel cell stack is increased.

6. A method of controlling an operation of a fuel cell system, the method comprising:

driving, by a controller, an air compressor configured to supply air to a cathode of a fuel cell stack at a lowest level in an idle stop state;

controlling, by the controller, an opening degree of an Airflow Control Valve (ACV) such that an output voltage of the fuel cell stack maintains a reference range; and during the idle stop state, opening, by the controller, a Fuel Discharge Valve (FDV) when a concentration of hydrogen on an anode side of the fuel cell stack is less than or equal to a reference value.

7. The method of claim 6, wherein the controlling of the opening degree of the ACV comprises discharging all the air supplied from the air compressor through an air discharge line without supplying the air to the cathode of the fuel cell stack when the idle stop state is started.

8. The method of claim 6, wherein the controlling of the opening degree of the ACV comprises:

supplying, to the cathode of the fuel cell stack, an amount of air required for maintaining the output voltage of the fuel cell stack in the reference range; and discharging, through an air discharge line, the air passing through the cathode of the fuel cell stack in the idle stop state.

9. The method of claim 6, wherein the opening of the FDV comprises:

opening the FDV during a reference time; and controlling the air compressor such that a pressure of the air supplied to the cathode of the fuel cell stack is increased.

\* \* \* \* \*